Dec. 7, 1954  G. W. VAN ZANDT  2,696,062
ANIMAL TRAP
Filed Dec. 13, 1950

Inventor
George W. Van Zandt
By Arthur H. Sturges
Attorney

United States Patent Office 2,696,062
Patented Dec. 7, 1954

2,696,062

ANIMAL TRAP

George W. Van Zandt, Des Moines, Iowa

Application December 13, 1950, Serial No. 200,630

3 Claims. (Cl. 43—85)

This invention relates to animal traps of the type used for animals that burrow in the ground such as moles, rats, ground squirrels and the like, and in particular a substantially cylindrical trap having rings in the ends connected by longitudinally disposed bars with spring actuated trip devices which when released kill the animal.

The purpose of this invention is to provide an animal trap that may be installed in a burrow or passage through the ground without obstructing the passage and without necessarily attracting the attention of the animal.

Animal traps have been provided in various designs, and whereas numerous types of traps of the hidden type have been used for large animals it has been found difficult to provide an efficient trap that may be installed in the burrow of a mole or the like. With this thought in mind, this invention contemplates a double end trap having triggers spaced inwardly from the ends and spring actuated gripping elements positioned to be released by the triggers and also positioned to snap the animal against a spike or point.

The object of this invention is, therefore, to provide means for constructing an animal trap so that it may readily be installed in a passage in the ground and in which gripping means is provided in each end so that it is not necessary for the animal to travel into the trap before the trap is snapped.

Another object of the invention is to provide an animal trap of the cylindrical type in which the gripping elements may readily be set from the ends of the trap.

A further object of the invention is to provide an animal trap for ground burrowing animals which is of a simple and economical construction.

With these and other objects and advantages in view, the invention embodies a substantially skeleton frame having rings at the ends connected on the lower sides by side bars and at the top by a single bar with springs on the rings and triggers pivotally mounted between the side bars and positioned to release gripping elements actuated by the springs.

Other features and advantages of the invention will appear from the following description taken in connection with the drawings, wherein.

Figure 1:
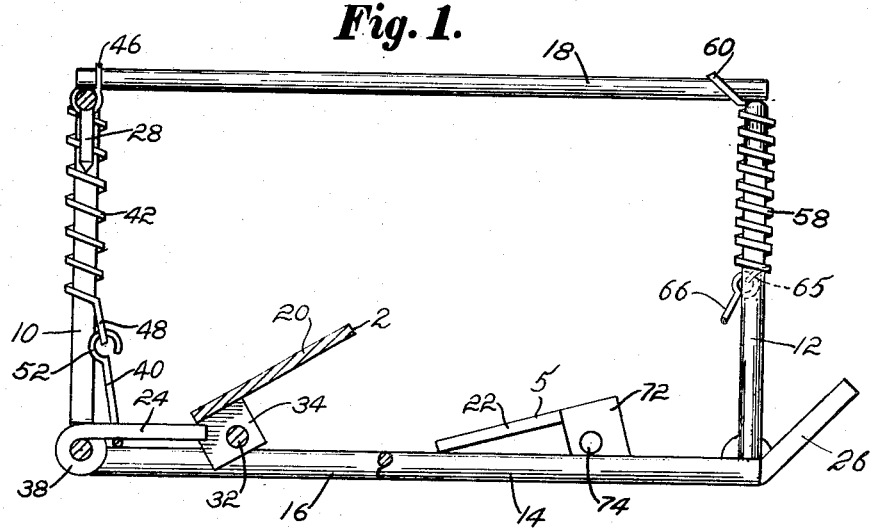
Figure 1 is a side elevational view of the trap with parts broken away and shown in section, and showing a trigger at one end in the set position, and a trigger at the opposite end in the released position.
Figure 2:
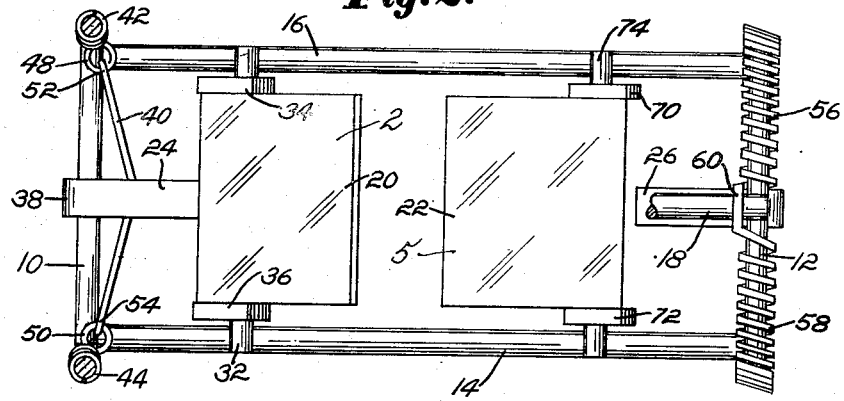
Figure 2 is a plan view of the trap also with parts broken away and shown in section with the pivotal latch at the right end being shown as extending inwardly of the adjacent ring.

Referring now to the drawings wherein like reference characters denote corresponding parts, the improved animal trap of this invention includes rings 10 and 12 at the ends, side bars 14 and 16, an upper bar 18, triggers 20 and 22, latches 24 and 26 which are pivotally mounted on the rings and positioned between the ends of the side bars, spikes 28 and 30 secured, preferably by welding, to upper portions of the rings, and suitable spring actuated gripping elements positioned on the rings.

In the design shown the rings and connecting bars are shown as formed of round stock and it will be understood that these elements may be formed of stock of any suitable shape.

The rings at the ends are also shown round and it will be understood that they may also be of any suitable shape.

The side bars and also the upper bar may be soldered, welded or otherwise secured to the rings or the parts may be made integral.

The trigger 20 is pivotally mounted on a transverse bar 32 by means of ears 34 and 36 and the bar 32 is positioned whereby the end of the latch 24 extends below the edge of the plate 2 forming the trigger 20 when the parts are set, as shown at the left in Figure 1. The bar 32 is mounted on and secured to the side bars 14 and 16.

The latch 24 is provided with a hub 38, and a cross bar 40 attached to the lower ends of springs 42 and 44 on the ring 10 extends below the latch, as shown. The adjacent upper ends of the springs 42 and 44 are connected together by a loop 46 at the top which extends over the bar 18 and loops 48 and 50 on the lower ends of the springs are connected to eyes 52 and 54 on the ends of the cross bar 40.

The gripping elements at the opposite end are formed in a similar manner with springs 56 and 58 on the ring 12 connected by a loop 60 at the top, which extends over the bar 18, and with loops 63 and 65 at the lower ends of the springs connected to the ends of a cross bar 66.

The cross bar 66 is held downwardly in the set position by the latch 26, similar to the latch 24, the latch being pivotally mounted on the ring 12 and positioned to extend under the edge of the plate 5 forming the trigger 22. The trigger 22 is pivotally mounted, by means of ears 70 and 72 on a transverse bar 74, similar to the bar 32.

Figure 3:
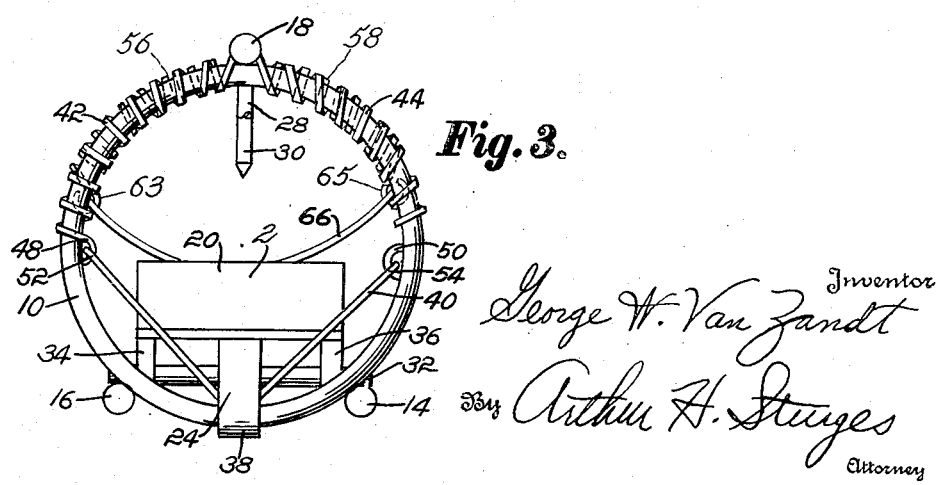
Figure 3 is an end elevational view looking toward the end of the trap in which the set trigger is positioned.

The springs 42 and 44, and similarly the springs 56 and 58, respectively, are so coiled and attached to each other that they tend to contract towards the middle or bar 18 when the cross bars are released, as shown by the parts 56, 58, and 66 in Figures 1 and 3.

By this means triggers adapted to be tripped are provided in the opposite ends of the trap and an animal entering from either end actuates one of the triggers.

With the parts arranged in this manner, a substantially cylindrical trap is provided with the rings at the ends connected by bars and with triggers mounted on the bars and associated with the rings, whereby as the triggers are actuated, the cross bars 40 and 66, which are released from the latches 24 and 26, respectively, grip the animals upwardly so that they are pierced by the spikes 28 and 30.

Snapping the animals upwardly in this manner holds the animal away from the ground and with the feet of the animal suspended in the air it is substantially helpless. It is also substantially impossible for the animal to move forwardly or backwardly when gripped in this manner.

From the foregoing description it is thought to be obvious that an animal trap assembly constructed in accordance with this invention is particularly well adapted for use by reason of the convenience and facility with which it may be assembled and operated, and it will also be obvious that the invention is susceptible of some change and modification without departing from the principles and spirit thereof, and for this reason it is not to be understood as being limited to the precise arrangement and formation of the several parts herein shown in carrying out the invention in practice, except as claimed.

Having thus fully described the invention, what I claim as new and desire to secure by Letters Patent is:

1. An animal trip comprising spaced vertically positioned end rings, side bars connecting the rings at spaced points on the lower portions thereof, a longitudinally disposed upper bar connecting the upper portions of the rings, springs coiled around the upper portions of each of the rings and positioned with the adjacent upper ends of the springs connected together, cross bars connected to the lower ends of the springs, triggers pivotally mounted on said side bars, and latches pivotally mounted on the lower parts of the rings and positioned between the side bars, said latches being positioned to extend over the cross bars and with the ends of the latches under the edges of the triggers.

2. In an animal trap, the combination which comprises spaced vertically positioned end rings, longitudinally positioned members connecting the rings and retaining the rings in upright positions, springs coiled around the upper portions of each of the rings and positioned with the adjacent upper ends of the springs connected together, downwardly bowed cross bars connected to the lower ends of the springs, triggers pivotally mounted on said longitudinally positioned connecting members, and latches pivotally mounted on the rings and positioned to extend over the cross bars and with the ends of the latches under edges of the triggers with the triggers in cocked positions.

3. In an animal trap, the combination which comprises spaced vertically positioned end rings, upper and lower longitudinally disposed members connecting the rings and retaining the rings in upright positions, springs coiled around the upper portions of each of the rings and positioned with the adjacent upper ends of the springs connected together, vertically positioned piercing points positioned in the rings and extended downwardly from upper portions of the rings, downwardly bowed cross bars connected to the lower ends of the springs, triggers pivotally mounted on said lower longitudinally disposed members, and latches pivotally mounted on the lower portions of the rings and positioned to extend over the cross bars and with the ends of the latches under edges of the triggers with the cross bars and triggers in cocked positions.

References Cited in the file of this patent

UNITED STATES PATENTS

| Number | Name | Date |
|---|---|---|
| 834,495 | Sandefur | Oct. 30, 1906 |
| 1,016,333 | Knapp | Feb. 6, 1912 |
| 1,049,781 | Teeter | Jan. 7, 1913 |
| 1,199,901 | Keeffner | Oct. 3, 1916 |
| 1,359,724 | Mosby | Nov. 23, 1920 |
| 2,348,002 | Glass | May 2, 1944 |

FOREIGN PATENTS

| Number | Country | Date |
|---|---|---|
| 25,939 | Great Britain | A. D. 1906 |
| 72,741 | Germany | Jan. 1894 |